Figures 1, 2:
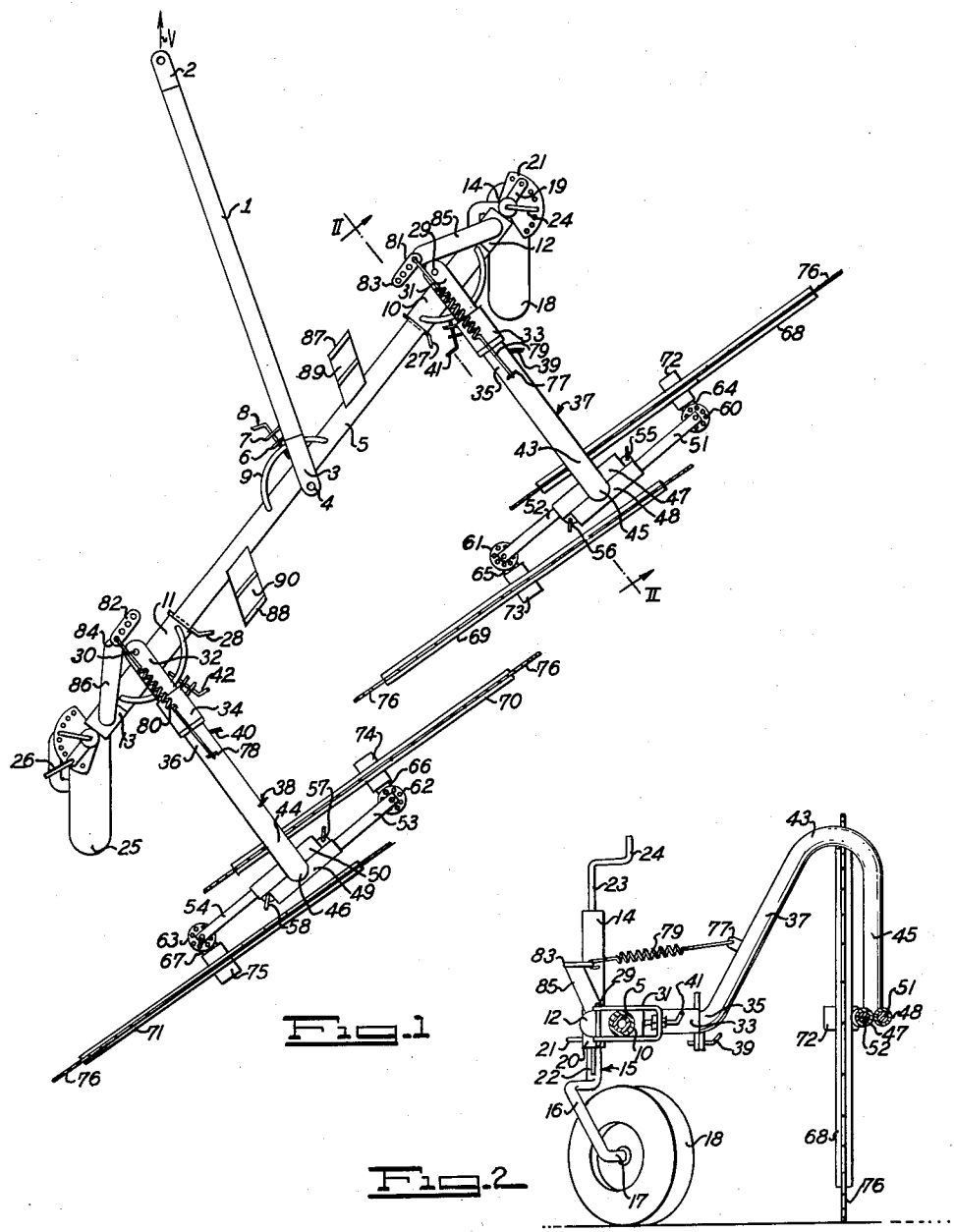

Jan. 3, 1961 C. VAN DER LELY 2,966,773
SIDE DELIVERY RAKING DEVICE
Filed Jan. 4, 1957 5 Sheets-Sheet 1

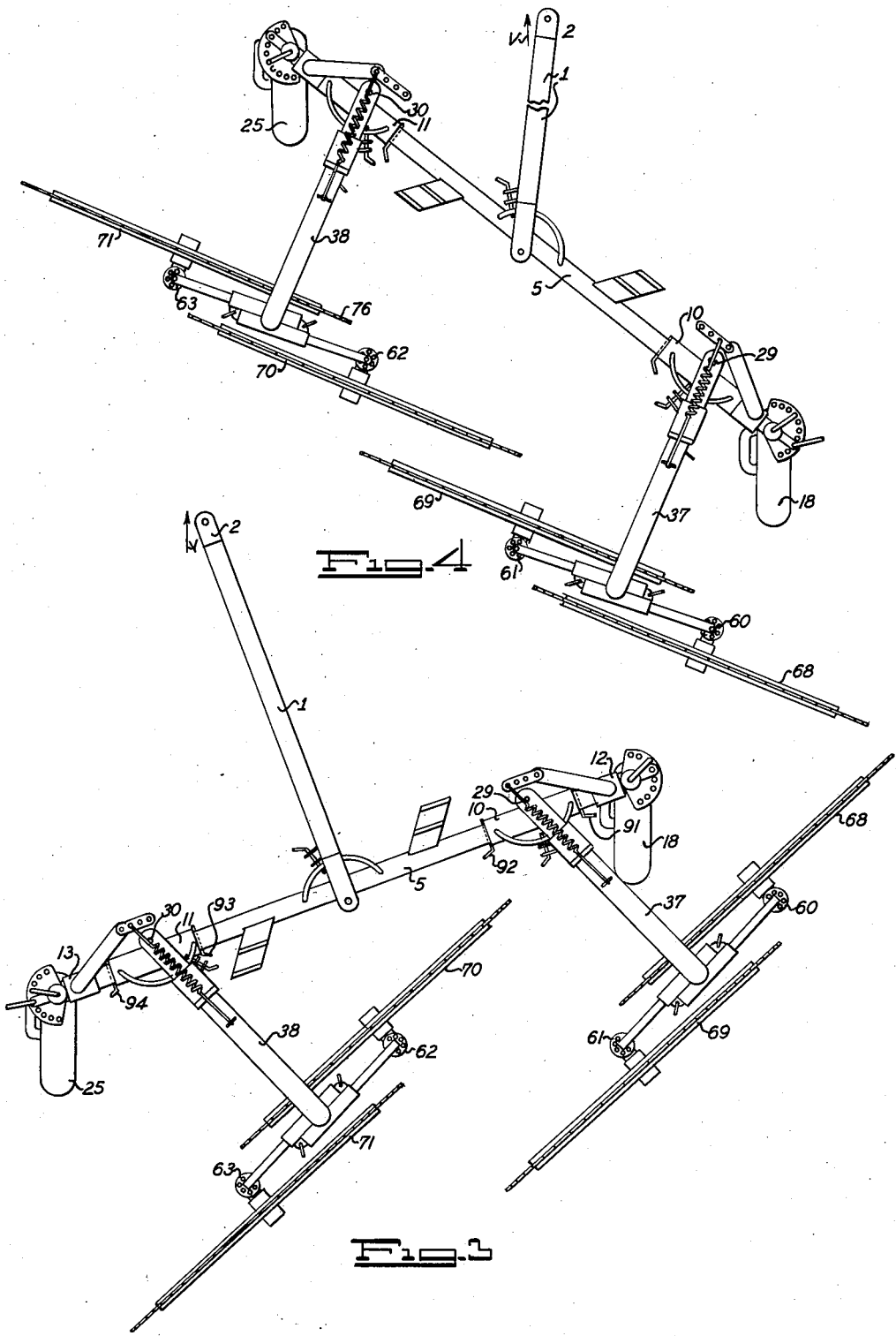

Jan. 3, 1961 C. VAN DER LELY 2,966,773
SIDE DELIVERY RAKING DEVICE
Filed Jan. 4, 1957 5 Sheets-Sheet 4

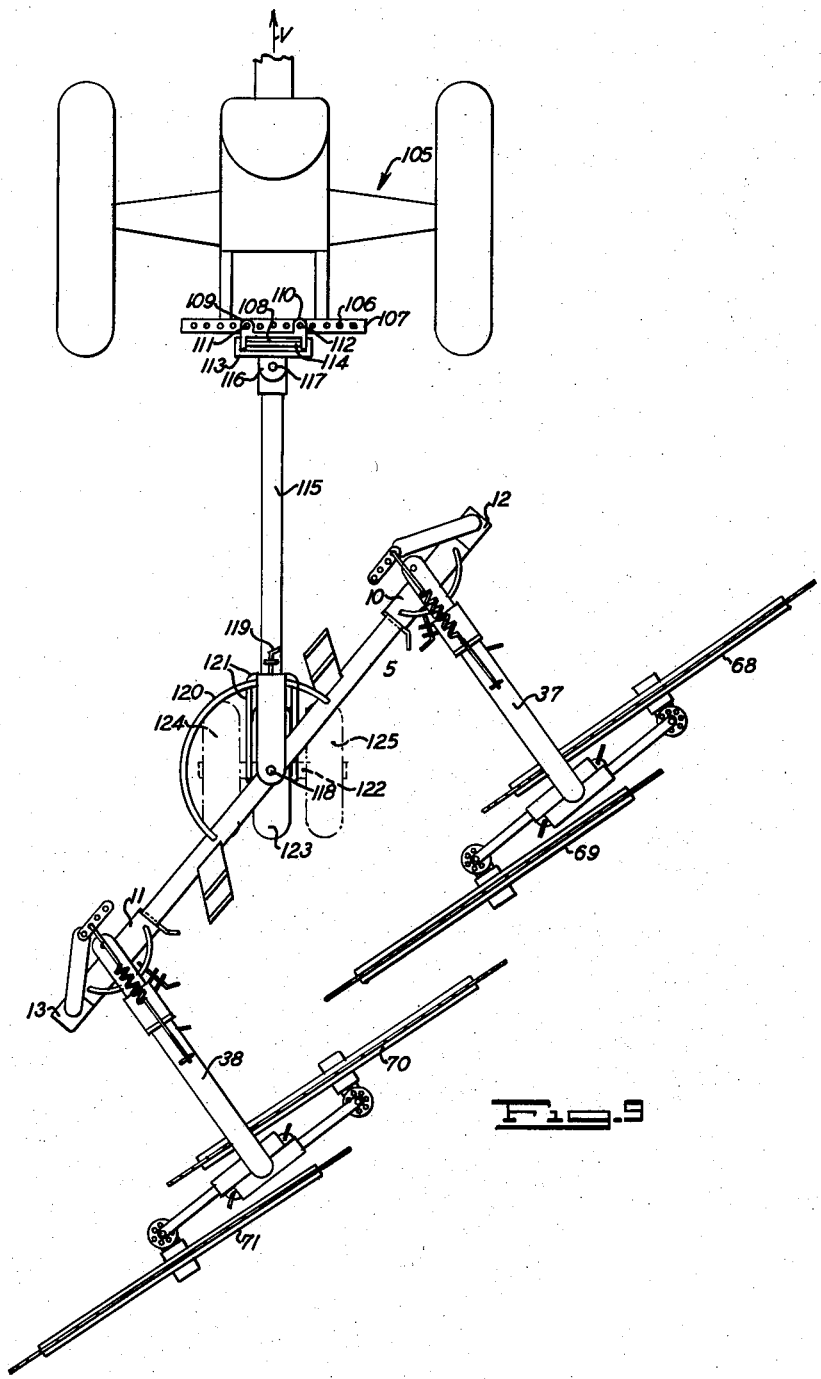

United States Patent Office 2,966,773
Patented Jan. 3, 1961

2,966,773

SIDE DELIVERY RAKING DEVICE

Cornelis van der Lely, Maasland, Netherlands, assignor to C. van der Lely N.V., Maasland, Netherlands Filed Jan. 4, 1957, Ser. No. 632,445

Claims priority, application Netherlands Jan. 6, 1956

9 Claims. (Cl. 56—377)

This invention relates to agricultural implements, and more particularly to devices for laterally displacing material lying on the ground. Devices are known which employ free-wheeling rake wheels in overlapping relationship, which rake wheels are rotated by contact with the ground. These devices are rendered effective for operation on uneven terrain by the provision of cranks and like devices which more or less resiliently couple the rake wheels to an associated frame.

It is an object of the invention to avoid the expense and additional weight necessitated by the use of cranks and like devices by the provision of an improved and novel arrangement of rake wheels upon the frame of an agricultural implement.

Additionally, most known implements of the aforementioned type are limited to a single function as a side delivery rake, a tedder or the like. Accordingly, a further object of the invention is to provide an improved agricultural implement capable of being readily adapted to numerous functions whereby a single implement may be employed for various different operations.

To achieve its various objectives, the invention contemplates the use of hinged connections for the rake wheels, the principal connection being hereinafter designated as a group hinge axis which permits the rake wheels to be coupled by a connecting beam to the main frame of the device under favorable loading conditions.

Preferably, the group hinge axis is horizontal, and the invention contemplates the use of an additional horizontal axis about which the rake wheels are pivotable so that they are better adapted for traversing uneven terrain.

Moreover, a vertical axis is employed in accordance with the invention for the transferral of the rake wheels from one working arrangement to another such as, for example, in connection with the conversion of a device from a side delivery rake to a swath turner.

Figure 5:
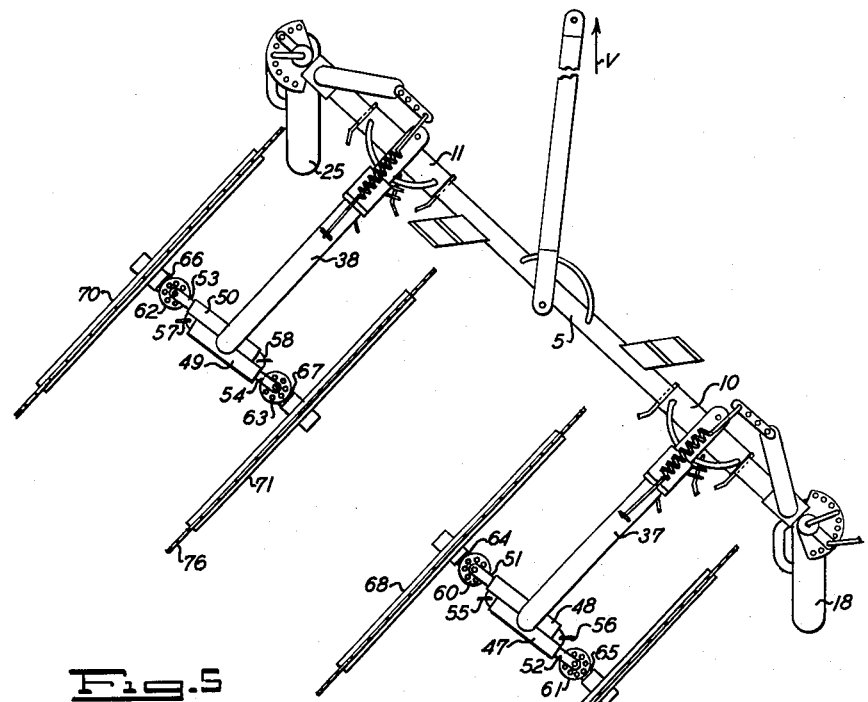
Figure 7:
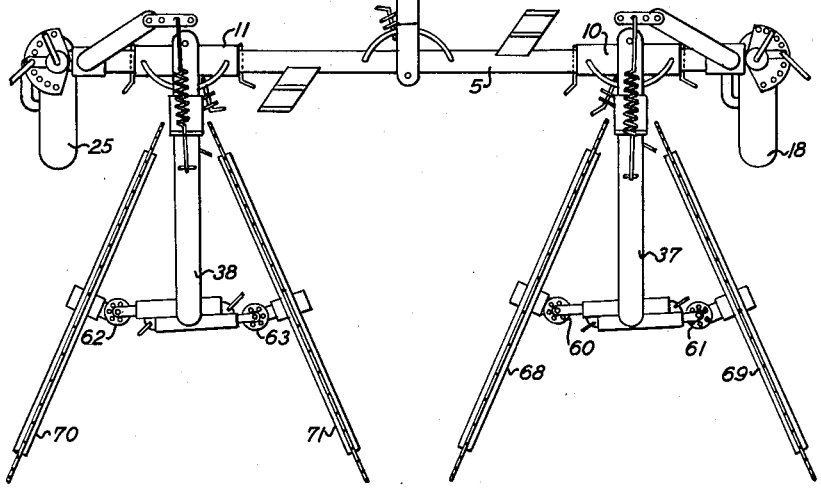
Figure 6:
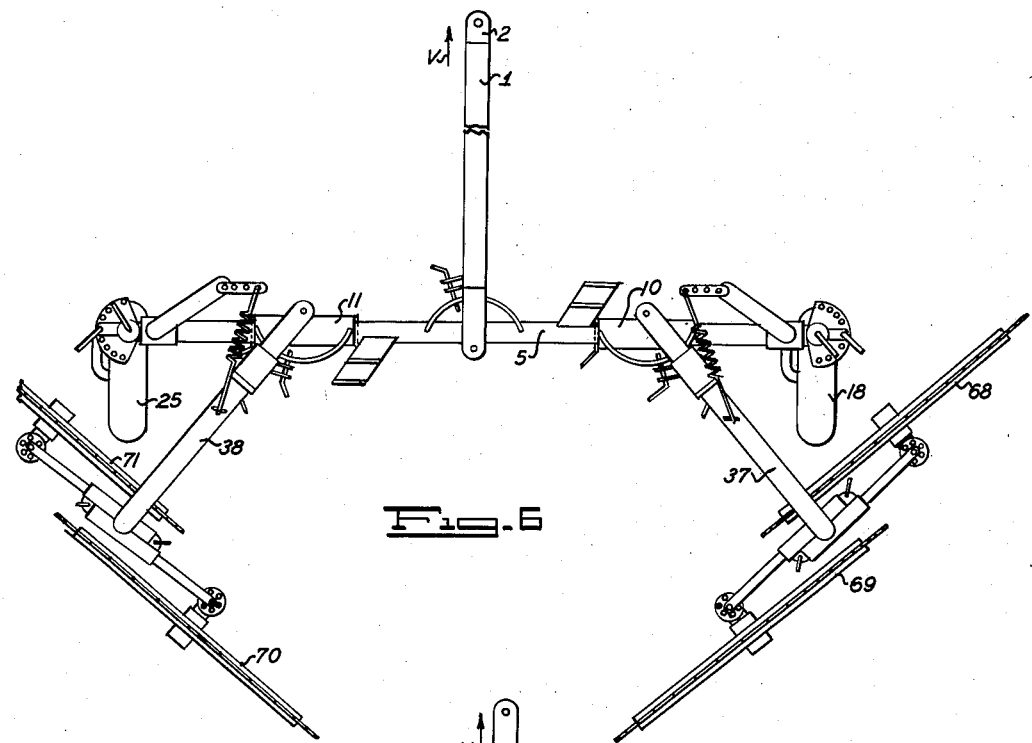
Figure 8:
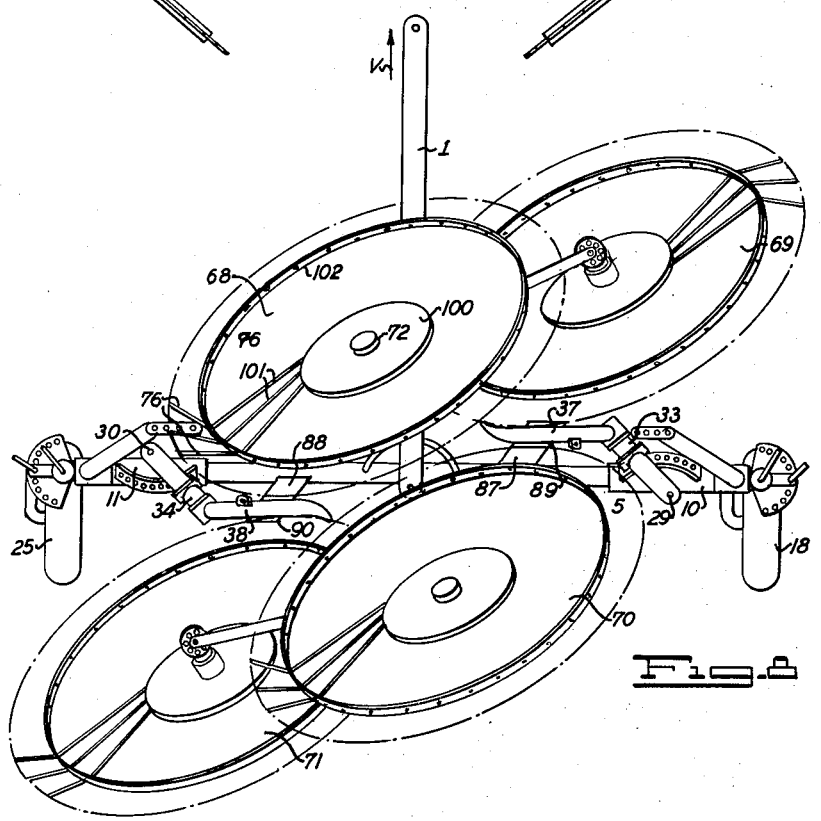

The invention is next more particularly explained with reference to the drawing in which:

Fig. 1 illustrates a first embodiment of the invention in which the device functions as a side delivery rake delivering to its left, Fig. 2 is a vertical sectional view of this device taken along line II—II in Fig. 1, Fig. 3 is a plan view of the same device in a working arrangement or condition as a swath turner delivering to its left, Fig. 4 is a plan view of the device shown in Fig. 1 but in a working condition in which it operates as a side delivery rake delivering to its right, Fig. 5 is a plan view of the same device operable as a tedder delivering to its left, Fig. 6 is a plan view of the same device in operable position as a side delivery rake delivering to its center, Fig. 7 is a plan view of the same device operable as a swath turner, Fig. 8 is a plan view of the device shown in Fig. 1 in which the device is adapted for transportation without working a crop, and Fig. 9 is a plan view of a variation of the device of Fig. 1 in a working condition in which it operates as a side delivery rake delivering to its left.

In Figures 1 and 2, there is shown a device for laterally displacing crop or like material lying on the ground. The device has a draw-bar 1, of which the front end 2 is perforated for attaching the draw-bar to a tractor or the like for moving the device in the direction indicated by the arrow V. The rear end of the draw-bar 1 is formed as a fork 3 (only the upper limb of which can be seen in this figure), which is pivotally connected to a frame member or beam 5 by means of a vertical hinge pin 4. The fork can be fixed in a number of positions with regard to the beam 5 by means of a locking pin 8 which can be inserted through apertures (not shown) formed in lugs 6 and 7 connected to the arm 1 and through any one of a number of apertures formed in a bowed strip 9 connected to the beam 5. The beam 5 is a tube, near the ends of which two bushings 10 and 11 are rotatably and movably mounted. The bushings 10 and 11 are held in place on the beam 5 by bushings 12 and 13 mounted on the extremities of the beam 5. Bushings 12 and 13 are detachable but are normally fixed so that they cannot rotate and move relative to the beam 5. The bushing 12 is fixedly connected to a vertical tube 14 in which a vertical rod 15 is carried. The lower extremity 16 of the rod 15 is connected to the horizontal axle 17 of a running wheel 18. The axle 17 is, when seen in plan view, spaced from the center line of the tube 14, so that the running wheel 18 is a caster wheel. However, the wheel 18 can be fixed in any desired position by means of a locking device, which comprises a perforated lug 19 fixedly connected to the tube 14, and a perforated sector 21 fixedly connected to a ring 20. The ring 20 can rotate about the tube 14, but is prevented from being withdrawn downwardly from the lower end of the tube 14 by a locking device. The rod 15 is further provided with a keyway 22, in which a projection on the ring 20 engages thus preventing the ring 20 from being able to rotate about the rod 15. The ring 20 can be fixed with regard to the tube 14 in different positions by putting a locking pin through the aperture in the lug 19 and an aperture in the sector 21 when the apertures are in register. Thereafter, the axle 17 cannot be rotated about the tube 14 but can be moved upwardly or downwardly relative to the tube 14. The desired height of the axle 17 relative to the tube 14 can be adjusted by means of a threaded spindle 23 which engages in a threaded aperture formed in the upper end of the tube 14, the spindle 23 being provided with a crank 24 for manual operation, and the lower end of the spindle resting against the upper end of the rod 15.

A running wheel 25 is connected to the bushing 13 in the same way as the running wheel 18 is attached to the bushing 12. The running wheels 18 and 25 are preferably adjusted so that the bushing 12 and 13 are the same height above the ground in all working positions of the device. However, in the working position shown in Figure 1 the running wheel 18 acts as a caster wheel, whereas the running wheel 25 is fixed in position by means of a locking pin 26.

In Figure 1, the bushings 10 and 11 are held in position against the bushings 12 and 13 by means of removable locking pins 27 and 28, which pass through the beam 5. The pins 27 and 28, however, do not prevent the bushings 10 and 11 from rotating about the beam 5. The bushings 10 and 11 are provided with hinge pins 29 and 30 about which forks 31 and 32 are rotatable, the hinge pins 29 and 30 having a substantially vertical position in most working arrangements. The forks 31 and 32 carry substantially horizontal bushings 33 and 34 in which the substantially horizontal front ends 35 and 36 of connecting elements or support means 37 and 38 are fixed so as to be rotatable but axially non-displaceable. The bushings 33 and 34 are disposed at only a small distance from their respective bushings 10 and 11, this distance being less than one sixth of the diameter of a rake wheel. The connecting elements 37 and 38 can be fixed to the forks 31 and 32 by means of locking pins 39 and 40. The forks 31 and 32 can be fixed relative to the bushings 10 and 11 by means of locking pins 41 and 42 relative to the bushings 10 and 11 in the same way as the draw-bar 1 can be fixed relative to the beam 5 by means of the locking pin 8.

The connecting elements 37 and 38 extend from their front ends 35 and 36 obliquely upwards to their highest points 43 and 44 from whence the rear ends 45 and 46 extend vertically downwards. The ends of the bows are connected to pairs of substantially horizontal tubes 47, 48 and 49, 50, the tubes 47, 48 and the end 45 being fixedly connected to one another, and the tubes 49, 50 and the end 46 being likewise fixedly connected one to the other. Rods 51, 52, 53 and 54 are rotatably and movably mounted in the tubes 47, 48, 49 and 50, the rods being capable of being conventionally clamped in the tubes by means of locking devices 55, 56, 57 and 58, which are clamping devices which exert an adjustable pressure against these rods. One extremity of each rod 51–54 is disposed in its respective tube 47–50, whereas its free extremity is connected by means of a fixable hinge connection or vertical hinge means 60, 61, 62 or 63 to an axle 64, 65, 66 or 67 of a respective one of four rake wheels 68, 69, 70 and 71, the hubs 72, 73, 74 and 75 of which are freely rotatable about said axles. The rake wheels are all of the same construction and each is provided with circumferential tines or teeth 76.

The connecting elements 37 and 38 carry eyes 77 and 78, to which the rear ends of helical springs 79 and 80 are connected, the front ends of the springs 79 and 80 being connected to the upper ends 83 and 84 of rods 85 and 86, which are fixedly connected to the bushings 12 and 13. The upper ends of the rods carry apertured members 81 and 82 for this purpose. When the front end 2 of the draw-bar 1 is held at a certain height above the ground by means of a tractor or the like, the springs 79 and 80 serve to reduce the pressure of the rake wheels 68—71 on the ground.

In the position shown in Figures 1 and 2, the device can act as a side delivery rake delivering to the left, all movable connections being fixed in the positions shown with the exception of the running wheel 18 which acts as a caster wheel. The connecting elements 37 and 38 in the bushings 33 and 34 are fixed in such a way that they can turn through a small angle in these bushings. Due to this arrangement of the movable connections, the rake wheels 68 and 69, which together form a first group of rake wheels, exert equal pressures on the ground and likewise the rake wheels 70 and 71, which form a second group, also exert equal pressures on the ground. Since the eyes 77 and 78, to which the rear ends of the spirngs 79 and 80 are connected, are located higher than the axes of the bushings 33 and 34, and since the other ends of the springs are also located above these axes, the springs will tend to hold the connecting elements 37 and 38 in an almost vertical plane.

The center line of the beam 5 forms, for the bushings 10 and 11 and thus for each of the groups of rake wheels a pivot axis, which will be herein referred to as the group-pivot axis or axle, i.e., that axis about which a group of rake wheels can be pivoted as a whole. A group of rake wheels in the above-described structure can turn about the group-pivot-axis when the rake wheels move over an irregularity in the ground.

The beam 5 is provided with two supporting members 87 and 88, in recesses 89 and 90 of which the connecting elements 37 and 38 can rest when the device is in a transport position to be described hereinafter.

When the device shown in Figures 1 and 2 is drawn over a field, the crop lying on the ground in a strip in front of the rake wheels will be delivered to the left of the rake wheel 71 and the device, therefore, forms a side delivery rake which delivers to the left.

By changing the height at which the running wheels 18 and 25 support the beam 5 the bushings 10 and 11 can be made to lie as high as, lower than, or higher than the axles 64–67 of the rake wheels. The higher the bushings 10 and 11 are located, the easier the rake wheels can be drawn over obstacles. The planes of the rake wheels can be made vertical or positioned at an angle to the vertical by turning the rods 51–54 in the tubes 47–50 through a suitable angle, if required.

In the device just described, the highest points 43 and 44 of the connecting elements 37 and 38 are disposed lower than the highest points of the rake wheels 68–71. As these bows are not supported by running wheels, but only by the rake wheels of which the teeth 76 are highly resilient, the danger of breaking the connecting elements 37 and 38 is small even though the greatest bending moment occurs at the highest points of the bows.

In Figure 3, the device is shown in a position which is different from the position shown in Figures 1 and 2, and in which the device can act as a swath turner. For example, the running wheel 25 and the draw-bar 1 are fixed in a different position relative to the beam 5. Further the connecting elements 37 and 38 are fixed at a different angle relative to the bushings 10 and 11, and finally the bushings 10 and 11 are brought together and are spaced from the bushings 12 and 13. The bushings 10 and 11 are, as before, freely rotatable about the beam 5, but pins 91 and 92 passed through the apertures in the beam 5 prevent axial movement of the bushing 10, while axial movement of the bushing 11 is prevented by like pins 93 and 94. In this position the rake wheels 68 and 69 are still in overlapping relation with the left-hand portion of the front wheel 68 disposed in front of the wheel 69 so that the rake wheels 68 and 69 can together displace a swath over a short distance, the swath being turned once. However, the swath is not delivered further to the left by the rake wheel 70, as was the case with the rake arrangement shown in Figure 1, since the rake wheel 69 is now partly located behind the rake wheel 70. However, the rake wheels 70 and 71 can together turn another swath. By changing the distance of the bushings 10 and 11 from one another, the device can be readily adapted to turn swaths the distance between which may vary. The device can be adapted to turn swaths of different widths by changing the positions of the connecting elements 37 and 38 relative to the bushings 10 and 11 by rotating the latter about the pins 29 and 30. A similar adaption can also be made by moving the rods 51 and 52 in their tubes 47 and 48 and the rods 53 and 54 in their tubes 49 and 50. The arrangement of the rake wheels of a group with respect to a connecting element in the position shown in Figure 3 is the same as in the positions shown in Figure 1.

In Figure 4, the device is shown in a working position in which it can act as a side delivery rake adapted to deliver to the right. This working position can be obtained from that shown in Figure 3 by turning the rake wheels 68—71 about the vertical axes of the hinge connections 60—63, while the position of the draw-bar 1 is changed relative to the beam 5. Another difference between the working positions shown in Figures 3 and 4 is that in Figure 4 the running wheel 25 is allowed to act as a caster wheel and the running wheel 18, which is now the rearmost running wheel, is fixed. Also, the bushings 10 and 11 are spaced further apart and the connecting bows 37 and 38 are turned through a small angle about the pins 29 and 30. The device shown in Figure 4 is a side delivery rake delivering to the right, and the rake wheels are arranged in overlapping relation to each other. When the position of the device is changed from that shown in Figure 1 or 3 to the position of Figure 4 with the device stationary, those teeth 76 which were the rearmost ones in the position shown in Figure 1 or 3 should also be made the rearmost ones in the position shown in Figure 4. Thus, the rearmost teeth are always directed downwardly in order to drop the material easily.

It will be appreciated that the device shown in Figure 4 can be changed into a swath turner delivering to the right by placing the beam 5 somewhat more transverse to the travelling direction, the direction of the connecting elements 37 and 38 relative to the travelling direction remaining unchanged, so that the rake wheel 69 becomes positioned in front of the rake wheel 70. Of course, the positions of the draw-bar 1 and the fixed running wheel 18 have to be altered for the new position of the beam 5, just as the positions of the draw-bars 1 and the running wheel 25 are altered when the device is changed from the working position shown in Figure 1 to that shown in Figure 3.

The device can also be used as a tedder as is shown in Figure 5. The angle between the draw-bar 1 and the beam 5 is altered to the required value, and the running wheel 18 is fixed in position, the running wheel 25 acting as a caster wheel. The connecting elements 37 and 38 are fixed so as to be substantially at right angles to the bushings 10 and 11. To obtain the position of the device shown in Figure 5 from one of the positions already described, the axles 64—67 have furthermore to be brought so as to lie in prolongation of the rods 51—54 by a turning of the hinge connections 60—63. Moreover, in one group of rake wheels, the locking devices 55 and 56 have to be temporarily released, and the rods 51 and 52 to be removed from the tubes 47 and 48 respectively and have to be replaced and fixed in the tubes 48 and 47 respectively, the rods being inserted further in the tubes than was previously the case. A similar change has to be made in the other group of rake wheels. The positions of the rake wheels 68 and 69 and the rake wheels 70 and 71 are thus changed so that if the rake wheel 71 in Figure 3 has teeth 76 directed downwardly at the rear, this rake wheel in Figure 5 will also have its teeth 76 directed downwardly at the rear, the same also applying for the other rake wheels.

The tedder shown in Figure 5 is adapted to deliver to the left, but a tedder adapted to deliver to the right can be obtained by turning the draw-bar 1 through an angle of about 75° to the right, by allowing the running wheel 18 to act as a caster wheel, and by fixing the running wheel 25 in a position turned through 90° to the right.

Referring now to Figure 6, the device is shown in a position where it is adapted to act as a rake delivering to the center. In this position the draw-bar 1 is disposed perpendicularly to the beam 5 and both the running wheels 18 and 25 are fixed with their wheel planes perpendicular to the beam 5. The bushings 10 and 11 have been moved as far as possible towards each other and have been prevented from moving axially, but are capable of freely rotating about the beam 5. The connecting elements or bows 37 and 38 have been placed so as to be substantially at right angles to each other and have been fixed in relation to the bushings 10 and 11. The rake wheels 68 and 69 are displaced in the same positions as in Figure 3 relative to the connecting element 37, while the rake wheels 70 and 71 are disposed in the same positions as in Figure 4 relative to the connecting bow 38. When the device is moved in the direction of the arrow V, the material will be delivered as a swath to the strip of land between the rake wheels 69 and 70.

In the position shown in Figure 7, the device is adapted to act as a swath spreader. The draw-bar 1 and the running wheels 18 and 25 have the same positions relative to the beam 5 as in Figure 6, and the connecting elements 37 and 38 and the rake wheels have substantially the same positions relative to the beam 5 as in Figure 5 with the difference that the positions of the planes of the rake wheels 68—71 have been altered by rotating the hinge connections 60—63 in such a way that the foremost teeth of the rake wheels 68 and 69 are nearer the connecting element 37 than the rearmost teeth, and that the foremost teeth of the rake wheels 70 and 71 are nearer the connecting element 38 than the rearmost teeth. The bushings 10 and 11 are placed at such a distance apart that the pairs of rake wheels 68, 69 and 70, 71 each work a swath. A swath worked by a pair of these rake wheels is pulled apart by the rake wheels so that the inner part of the swath is brought to the surface and as a result the swath can dry better.

Finally the device can be brought into a transport position which is shown in Figure 8. The position of the draw-bar 1, the beam 5 and the running wheels 18 and 25 relative to each other is the same as in Figures 6 and 7, but the bushings 10 and 11 have been moved as far apart from one another as possible.

Starting, for example, from the working position shown in Figure 4, the transport position can be obtained by first fixing the axles of the running wheels 18 and 25 and the draw-bar 1 in the positions illustrated. Afterwards, the locking devices preventing rotation of the connecting elements 37 and 38 in the bushings 33 and 34 and about the axes 29 and 30 are removed and the connecting element 38 is turned through an angle of about 30° to the right, while the connecting element 37 is turned through an angle of about 150° to the left. After this, the connecting elements or bows 37 and 38 are again fixed in the bushings 33 and 34, and the connecting elements 37 and 38 are lifted up and placed in the recesses 89 and 90 of the supporting members 87 and 88, which are connected to the beam 5. The rake wheels 68—71 are thus placed in the positions shown in Figure 8, where there is no danger that the rake wheels can come into contact with the ground during transport of the device.

In Figure 8, the construction of the rake wheel 68 is further shown. The hub 72 of this rake wheel is provided with a round disc 100, to which spokes 101 are connected. The spokes 101 pass through apertures formed in a rim 102, and the extremities of the spokes 101 extend outside the rim 102, the extremities being bent outside the rim 102 so as to constitute the teeth 76. The rake wheels 69—71, which are all of the same construction, are shown only schematically in the drawing for the sake of simplicity.

Referring now to Figure 9, there is shown a modification of the device shown in the previous figures. The device shown in Figure 9 is drawn by a tractor 105, which at its rear carries a beam 107 formed with apertures 106. A wide fork 108 having perforated lugs 109 and 110, is detachably but immovably connected to the beam 107 by means of pins or bolts 111 and 112. A second wide fork 113 is pivotally connected to the fork 108 by means of a horizontal hinge pin 114, there being but little play between the two forks. A draw-bar 115 is connected to the fork 113 by means of a hinge connection 116 which has a vertical axis 117, the play at the hinge connection 116 again being small, so that the draw-bar 115 can only rotate about its longitudinal axis if the tractor 105 turns about its longitudinal axis. The draw-bar 115 is pivotally connected to a beam 5, which is the same as the beam 5 shown in Figures 1–8. The draw-bar 115 is rotatable about a vertical pin 118, and a locking pin 119 is provided for securing the draw-bar 115 relative to a bent strip 120, which is fixedly connected to the beam 5.

A downwardly directed fork 121 is fixedly connected to the draw-bar 115, and the axle 122 of a running wheel 123 is attached in the fork 121. The beam 5 carries rotatable bushings 12 and 13 which, in contrast to the device shown in Figures 1–8 do not carry running wheels. The bushings 10 and 11 carry rake wheels 68—71 with the aid of connecting bows 37 and 38 in the same way as described for the device shown in Figure 1. In the construction shown in Figure 9, the beam 5 can only cant if the draw-bar 115 turns about its longitudinal axis, so that any canting movements will, therefore, be slight. The wheel pressures of the rake wheels will remain substantially equal to each other during slight canting movements of the beam 5 by virtue of the rotatability of the bushings 10 and 11 and for the further reasons described with reference to Figure 1. It is to be noted that, in the hitherto known combinations of a tractor with a hay raking device which is connected to the tractor by means of a draw-bar carrying a running wheel, there is generally considerable play at the hinge connection between the draw-bar and the tractor, so that the tractor can roll about its longitudinal axis without affecting the hay raking device.

An advantage of the construction shown in Figure 9 is that only one running wheel is required so that the entire weight of the device rests on the running wheel thus giving rise to a resistance against any tendency to slip sideways. However, it is also possible to replace the running wheel 123 by two running wheels 124 and 125, which in Figure 9 are shown by dotted lines and which have the same axle 122 as the wheel 123 so that the resistance to slipping is increased.

What is claimed is:

1. An agricultural device having a determinable direction of travel comprising a mobile frame, at least two groups of freely rotatable rake wheels, connecting elements supporting the rake wheels of each group in overlapping relation, bushings rotatable on said frame and having a common horizontal axis of rotation, vertical hinge pins operatively associated with said bushings and supported thereon, said connecting element being operatively associated with and pivotal on said hinge pins, and locking means on said bushings and operatively associated with said connecting elements to fix the positions of the latter on said hinge pins.

2. A device as claimed in claim 1 comprising rods operatively associated with the connecting elements and extending in opposite directions therefrom, said rods connecting the rake wheels to said connecting elements.

3. A device as claimed in claim 1 wherein the connecting elements include bushings and end portions rotatable in said end portions.

4. A device as claimed in claim 1 comprising running wheels on and supporting said frame.

5. A device as claimed in claim 1 comprising springs on the frame and operatively associated with the connecting elements to partly support the latter.

6. A device as claimed in claim 1 comprising a draw arm operatively associated with the frame and adjustable relative thereto.

7. A device as claimed in claim 1 comprising means operatively associated with said frame for adjusting the elevation of said axis.

8. A device as claimed in claim 1 comprising vertical hinge means operatively associated with said connecting elements and rake wheels and supporting the latter on the connecting elements.

9. A device as claimed in claim 2 comprising tubes on the connecting elements and slidably supporting said rods, and locking devices operatively associated with said tubes and rods for fixing the positions of the rake wheel.

References Cited in the file of this patent

UNITED STATES PATENTS

| 2,588,599 | Winter | Mar. 11, 1952 |
| 2,603,053 | Lipe et al. | July 15, 1952 |
| 2,670,588 | Plant | Mar. 2, 1954 |
| 2,796,723 | Smith et al. | June 25, 1957 |

FOREIGN PATENTS

| 1,083,596 | France | June 30, 1954 |
| 159,137 | Australia | Sept. 30, 1954 |